United States Patent
Chen

(10) Patent No.: US 11,363,645 B2
(45) Date of Patent: Jun. 14, 2022

(54) METHOD AND DEVICE FOR RANDOM ACCESS AND INSTRUCTION AFTER RANDOM ACCESS ROLLBACK

(71) Applicant: China Academy of Telecommunications Technology, Beijing (CN)

(72) Inventor: Li Chen, Beijing (CN)

(73) Assignee: DATANG MOBILE COMMUNICATIONS EQUIPMENT CO. LTD., Beijing (CN)

( * ) Notice: Subject to any disclaimer, the term of this patent is extended or adjusted under 35 U.S.C. 154(b) by 218 days.

(21) Appl. No.: 16/496,926

(22) PCT Filed: Feb. 23, 2018

(86) PCT No.: PCT/CN2018/077051
§ 371 (c)(1),
(2) Date: Sep. 23, 2019

(87) PCT Pub. No.: WO2018/171376
PCT Pub. Date: Sep. 27, 2018

(65) Prior Publication Data
US 2020/0128582 A1    Apr. 23, 2020

(30) Foreign Application Priority Data
Mar. 24, 2017 (CN) .......................... 201710184460.8

(51) Int. Cl.
*H04W 74/08* (2009.01)
*H04W 74/00* (2009.01)
*H04W 72/04* (2009.01)

(52) U.S. Cl.
CPC ....... *H04W 74/085* (2013.01); *H04W 72/048* (2013.01); *H04W 74/008* (2013.01); *H04W 74/0833* (2013.01); *H04W 74/002* (2013.01)

(58) Field of Classification Search
CPC ............ H04W 74/085; H04W 74/008; H04W 74/0833; H04W 74/002; H04W 72/048; H04W 74/00
See application file for complete search history.

(56) References Cited

U.S. PATENT DOCUMENTS 9,210,726 B2 * 12/2015 Bai ................... H04W 36/0055
2010/0232364 A1    9/2010 Hsu
(Continued)

FOREIGN PATENT DOCUMENTS

CN      101547520 A    9/2009
CN      102291822 A    12/2011
(Continued)

OTHER PUBLICATIONS

China Mobile et al: "Backoff for UEs of different priorities", 3GPP Draft; R2-080750, 3rd Generation Partnership Project (3GPP), Mobile Competence Centre; 650, Route Des Lucioles ; F-06921 Sophia-Antipolis Cedex; France, vol. RAN WG2, No. Sorrento, Italy; Feb. 5, 2008, Feb. 11-15, 2008, p. 1, lines 14-15, p. 2, lines 3-26.
(Continued)

*Primary Examiner* — Nishant Divecha
(74) *Attorney, Agent, or Firm* — Foley & Lardner LLP

(57) ABSTRACT

Disclosed are a method and device for random access and instruction after random access rollback. The method comprises: a base station receiving a random access request Msg1 sent by a terminal, and sending a random access rollback instruction to instruct different types of terminals to apply different rollback parameters so as to initiate random access again after random access has failed; and the terminal receiving the random access rollback instruction sent by the base station, wherein the random access rollback instruction is used for instructing different types of terminals to apply different rollback parameters so as to initiate random access
(Continued)

again after random access has failed, and initiating random access according to the random access rollback instruction.

19 Claims, 4 Drawing Sheets

(56) References Cited

U.S. PATENT DOCUMENTS

| | | | |
|---|---|---|---|
| 2012/0051297 A1* | 3/2012 | Lee | H04W 80/02 370/329 |
| 2012/0275305 A1* | 11/2012 | Lin | H04W 74/0841 370/235 |
| 2013/0034059 A1 | 2/2013 | Lee et al. | |
| 2013/0040597 A1* | 2/2013 | Jang | H04W 74/0833 455/404.1 |
| 2013/0128733 A1 | 5/2013 | Lee et al. | |
| 2015/0009813 A1* | 1/2015 | Nguyen | H04W 4/70 370/230 |
| 2015/0173074 A1* | 6/2015 | Zhao | H04W 74/085 370/336 |
| 2015/0326387 A1 | 11/2015 | Dionne et al. | |

FOREIGN PATENT DOCUMENTS

| | | |
|---|---|---|
| CN | 102291836 A | 12/2011 |
| CN | 102984806 A | 3/2013 |
| EP | 2 645 758 A1 | 10/2013 |
| EP | 2706809 A2 | 12/2014 |
| WO | WO 2011160579 A1 | 12/2011 |

OTHER PUBLICATIONS

Samsung: "RACH procedure considering flexible UE bandwidth" 3GPP Draft: R1-161249 RACH Procedure Considering Flexible UE BW—Samsung, 3rd Generation Partnership Project (3GPP), Mobile Competence Centre; 650, Route Des Lucioles; F-06921 Sophia-Antipolis Cedex, vol. RAN WG1, No. Reno, Nov. 14-18, p. 2, lines 29-41.
Huawei, HiSilicon, Access control in NR, 3GPP TSG-RAN WG2 Meeting #96, R2-168256, Reno, Nevada, USA, Nov. 12-18, 2016, Nov. 4, 2016.
Huawei, HiSilicon, Initial Access with Multiple Numerologies, 3GPP TSG-RAN WG2 Meeting #96, R2-167574, Reno, Nevada, USA, Nov. 14-18, 2016, 3GPP, Nov. 5, 2016.
Oppo, Consideration on Random Access in NR, 3GPP TSG-RAN2 #97, R2-1700962, Athens, Greece, Feb. 13-17, 2017, 3GPP, Feb. 4, 2017.

* cited by examiner

METHOD AND DEVICE FOR RANDOM ACCESS AND INSTRUCTION AFTER RANDOM ACCESS ROLLBACK

This application is a US National Stage of International Application No. PCT/CN2018/077051, filed Feb. 23, 2018, designating the United States, and claiming the benefit of Chinese Patent Application No. 201710184460.8, filed with the Chinese Patent Office on Mar. 24, 2017, and entitled "A method and device for a random access after a random access backoff, and a method and device for indicating a random access backoff", which is hereby incorporated by reference in its entirety.

FIELD

The present invention relates to the field of wireless communications, and particularly to a method and device for a random access after a random access backoff, and a method and device for indicating a random access backoff.

BACKGROUND

Random accesses in a Long Term Evolution (LTE) system include a contention-based random access and a non-contention-based random access.

In the contention-based random access, a user equipment initially accesses a base station; a Radio Resource Control (RRC) connection is reestablished; a handover is performed; when the user equipment is not synchronized, downlink data arrive in a non-RRC-connected state, and uplink data arrive in an RRC-connected state; the user equipment is positioned in the RRC connected state; etc.

FIG. 1 is a schematic flow chart of the contention-based random access, and as illustrated in FIG. 1, the flow generally includes the following four steps.

Msg1: A User Equipment (UE) or a terminal selects a random access preamble and a Physical Random Access Channel (PRACH) resource, and sends the selected random access preamble to a base station over the PRACH resource.

Msg2: The base station receives the random access preamble, calculates a Timing Advance (TA), and sends a random access response to the UE, where the random access response includes the timing advance, an uplink grant for Msg3, and a Cell-Radio Network Temporary Identifier (C-RNTI) allocated by the network side. A physical Downlink Control Channel (PDCCH) carrying the grant of Msg2 is scrambled using a Random Access-Radio Network Temporary Identifier (RA-RNTI) uniquely corresponding to a time-frequency resource over which Msg1 is sent in a 10 ms window; and Msg2 also carries a random access preamble ID, and the UE determines that Msg2 corresponds to Msg1 sent by the UE, according to the RA-RNTI and the random access preamble ID.

Msg3: The UE sends uplink transmission in the uplink grant specified by the Msg2, where uplink transmission of Msg3 may vary with a different reason of the random access, and for example, an RRC Connection Setup request is sent in Msg3 for an initial access.

Msg4: This relates to a contention resolution message, and the UE can determine whether the random access is successful, according to Msg4. For the initially accessing UE, the temporary C-RNTI is translated automatically into a C-RNTI identifying the UE uniquely in the cell, after the contention is resolved successfully.

In the non-contention-based random access, a handover is performed, downlink data arrive, a user equipment is positioned, uplink timing is obtained, etc. FIG. 2 is a schematic flow chart of the non-contention-based random access, and as illustrated in FIG. 2, the flow generally includes the following three steps.

Msg0: A base station allocates the user equipment with a dedicated random access preamble for the non-contention-based random access, and a PRACH resource for the random access.

Msg1: The UE sends the specified dedicated random access preamble to the base station over the specified PRACH resource according to Msg0, and the base station calculates an uplink Timing Advance (TA) according to Msg1 upon reception of Msg1.

Msg2: The base station sends a random access response to the UE, where the random access response includes the timing advance, and an uplink grant for subsequently scheduling an uplink transmission resource, and the timing advance indicates a timing relationship of subsequent uplink transmission by the UE.

After the UE sends Msg1, if the base station receives the random access request Msg1 sent by the UE, but can not be accessed by the UE (for example, because a too large number of UEs are requesting for a random access, there is no sufficient resource, etc.), then a Backoff Indicator (BI) will be carried in the random access response. In the LTE, the backoff indicator is carried in a Media Access Control (MAC) sub-header, and FIG. 3 is a schematic structural diagram of the MAC sub-header including E, T, R, R, and BI, where "E" indicates whether the next MAC sub-header is an MAC sub-header carrying a random access preamble ID, or a Random Access Response (RAR), "T" indicates whether a BI value or a random access preamble ID follows the current sub-header, "R" represents a reserved bit, and "BI" indicates a backoff time parameter. The UE selects an instance of time from 0 to a value indicated in the BI field in a uniformly distributed algorithm according to the value indicated by BI, and resends Msg1 at the instance of time, that is, initiates a new random access. When there is a high load of random accesses in the cell, the base station indicates a larger backoff value so that the UE is delayed reinitiating the random access; and when there is a low load of random accesses in the cell, the base station indicates s smaller backoff value so that the UE failing with the random access can initiate an attempt on a new random access quickly.

A drawback in the prior art lies in that the existing random access backoff mechanism can not satisfy the existing variety of user demands, so the UE may not access the network quickly so that subsequent service data may be blocked from being transmitted.

SUMMARY

Embodiments of the invention provide a method and device for a random access after a random access backoff, and a method and device for indicating a random access backoff so as to address the problem in the prior art that the existing random access backoff mechanism can not satisfy the existing variety of user demands.

In a first aspect, an embodiment of the invention provides a method for a random access after a random access backoff, the method including: sending a random access request Msg1 to a base station; receiving a random access backoff indicator sent by the base station, wherein the random access backoff indicator indicates different backoff parameters of different categories of user equipments so that they reinitiate a random access after their random accesses fail; and initiating a random access according to the random access backoff indicator.

Optionally if a default backoff parameter in the random access backoff indicator is 0, then a random access will be initiated over a proximate resource, wherein the default backoff parameter in the random access backoff indicator is set to 0 for a specific user equipment which is a user equipment with a short delay, or a user equipment with a short-delay service.

Optionally sending the random access request Msg1 to the base station includes: sending the random access request Msg1 over a random access resource corresponding to a category of user equipment among the different random access resources pre-allocated by the base station for the different categories of user equipments.

Optionally initiating the random access according to the random access backoff indicator includes: determining a time value corresponding to a Backoff Indicator (BI) parameter in the random access backoff indicator according to a category of user equipment, and then initiating the random access according to the time value, wherein the BI parameter in the random access backoff indicator corresponds to different time values for the different categories of user equipment.

Optionally initiating the random access according to the random access backoff indicator includes: initiating the random access according to a BI value determined according to a user demand of the user equipment, and/or the category of user equipment among a plurality of BI values indicated in the backoff indicator of a random access response.

Optionally the plurality of BI values are indicated by the base station in the random access backoff indicator of the random access response by carrying indicators of a plurality of categories of user equipments, and BI parameters corresponding respectively to the categories of user equipments in a Media Access Control (MAC) sub-header.

Optionally the user equipment is categorized according to one or more of a category of user equipment, a Quality of service Class Identifier (QCI) demand of a user equipment user service, a QCI demand of a user equipment service, a network serving the user equipment, a Radio Access Network (RAN)-side slice serving the user equipment, and an RAN-side slice serving the user equipment service; and/or when there are a plurality of services of the user equipment, a service demand for triggering a random access is determined as the current demand of the user equipment, and the user equipment is categorized according to the service demand.

Optionally the method further includes: receiving a backoff threshold indicated by the base station, if the BI parameter of the user equipment indicated by the random access backoff indicator is below the backoff threshold, then calculating, by the user equipment, an instance of time for reinitiating a random access, in a uniformly distributed algorithm, and if the BI parameter of the user equipment indicated by the random access backoff indicator is above the backoff threshold, then calculating, by the user equipment, an instance of time for reinitiating a random access, in a non-uniformly-distributed algorithm; or receiving an access factor indicated by the base station, and revising the BI parameter of the user equipment indicated by the random access backoff indicator according to the access factor, wherein if there is a shorter delay required of the user equipment, then there will be a higher access probability of the user equipment indicated by the access factor.

In a second aspect, an embodiment of the invention provides a method for a UE to perform a random access backoff, the method including: receiving, by a base station, a random access request Msg1 sent by a user equipment; and sending a random access backoff indicator indicating different backoff parameters of different categories of user equipments so that they reinitiate a random access after their random accesses fail.

Optionally a default backoff parameter of a specific user equipment is set to 0 in the random access backoff indicator, wherein the specific user equipment is a user equipment with a short delay, or a user equipment with a short-delay service.

Optionally the random access backoff indicator is allocated for each user equipment from which the random access request is received over a corresponding random access resource, and which has a corresponding demand, wherein the base station pre-allocates different random access resources for the different categories of user equipments.

Optionally a Backoff Indicator (BI) parameter in the random access backoff indicator corresponds to different time values for the different categories of user equipments.

Optionally a plurality of BI values are indicated by the base station in the random access backoff indicator of a random access response, wherein the BI values are determined according to user demands and/or user equipment categories of the user equipments.

Optionally the plurality of BI values are indicated by the base station in the random access backoff indicator of the random access response by carrying indicators of a plurality of categories of user equipments, and BI parameters corresponding respectively to the categories of user equipments in a Media Access Control (MAC) sub-header.

Optionally before the base station sends the random access backoff indicator, the method further includes: categorizing the user equipments, and applying different backoff parameters to the different categories of user equipments, wherein the categorizing the user equipments includes: categorizing the user equipments according to one or more of the categories of the user equipments, Quality of service Class Identifier (QCI) demands of user equipment services or user equipment user services, and networks serving the user equipments or the user equipment services, or Radio Access Network (RAN)-side slices of the user equipments or the user equipment services; and/or when there are a plurality of services of a user equipment, determining a service demand for triggering a random access as the current demand of the user equipment, and categorizing the user equipment according to the service demand.

Optionally after the user equipment is categorized, selecting, by the base station, a BI value corresponding to the category of user equipment, and indicating the BI value in the random access backoff indicator in the random access response includes: indicating a backoff threshold to the user equipment so that the user equipment calculates an instance of time for reinitiating a random access, in a uniformly distributed algorithm when the BI value is below the backoff threshold, and calculates an instance of time for reinitiating a random access, in a non-uniformly-distributed algorithm when the BI value is above the backoff threshold; or indicating an access factor to the user equipment, wherein if there is a shorter delay required of the user equipment, then there will be a higher access probability of the user equipment indicated by the access factor.

In a third aspect, an embodiment of the invention provides a device for a random access after a random access backoff, the device including: a sending module configured to send a random access request Msg1 to a base station; a receiving module configured to receive a random access backoff indicator sent by the base station, wherein the random access backoff indicator indicates different backoff parameters of different categories of user equipments so that they reinitiate a random access after their random accesses fail; and the sending module further configured to initiate a random access according to the random access backoff indicator.

Optionally the sending module is further configured to initiate a random access over a proximate resource when a default backoff parameter in the random access backoff indicator is 0, wherein the default backoff parameter in the random access backoff indicator is 0 for a specific user equipment which is a user equipment with a short delay, or a user equipment with a short-delay service.

Optionally the sending module is further configured to send the random access request Msg1 over a random access resource corresponding to a category of user equipment among the different random access resources pre-allocated by the base station for the different categories of user equipments.

Optionally the sending module is further configured to determine a time value corresponding to a Backoff Indicator (BI) parameter in the random access backoff indicator according to a category of user equipment, and to initiate the random access according to the time value, wherein the BI parameter in the random access backoff indicator corresponds to different time values for the different categories of user equipment.

Optionally the sending module is further configured to initiate the random access according to a BI value determined according to a user demand of the user equipment, and/or the category of user equipment among a plurality of BI values indicated in the backoff indicator of a random access response.

Optionally the sending module is configured to initiate the random access according to the random access backoff indicator when the base station indicates the plurality of BI values in the random access backoff indicator of the random access response by carrying indicators of the categories of user equipments, and BI parameters corresponding to the categories of user equipments in a Media Access Control (MAC) sub-header.

Optionally the user equipment is categorized according to one or more of a category of user equipment, a Quality of service Class Identifier (QCI) demand of a user equipment user service, a QCI demand of a user equipment service, a network serving the user equipment, an RAN-side slice serving the user equipment, and a Radio Access Network (RAN)-side slice serving the user equipment service; and/or when there are a plurality of services of the user equipment, a service demand for triggering a random access is determined as the current demand of the user equipment, and the user equipment is categorized according to the service demand.

Optionally the receiving module is further configured to receive a backoff threshold indicated by the base station to the user equipment, and the sending module is further configured to calculate an instance of time for reinitiating a random access, in a uniformly distributed algorithm when the BI parameter of the user equipment indicated by the random access backoff indicator is below the backoff threshold, and to calculate an instance of time for reinitiating a random access, in a non-uniformly-distributed algorithm when the BI parameter of the user equipment indicated by the random access backoff indicator is above the backoff threshold; or the receiving module is further configured to receive an access factor indicated by the base station to the user equipment, and the sending module is further configured to revise the BI value of the user equipment indicated by the random access backoff indicator according to the access factor, wherein if there is a shorter delay required of the user equipment, then there will be a higher access probability of the user equipment indicated by the access factor indicated by the base station.

In a fourth aspect, an embodiment of the invention provides a device for a UE to perform a random access backoff, the device including: a request receiving module configured to receive a random access request msg1 sent by a user equipment; and an indicating module configured to send a random access backoff indicator indicating different backoff parameters of different categories of user equipments so that they reinitiate a random access after their random accesses fail.

Optionally the indicating module is further configured to set a default backoff parameter of a specific user equipment to 0 in the random access backoff indicator, wherein the specific user equipment is a user equipment with a short delay, or a user equipment with a short-delay service.

Optionally the random access backoff indicator is allocated for each user equipment from which the random access request is received over a corresponding random access resource, and which has a corresponding demand, wherein different random access resources are pre-allocated for the different categories of user equipments.

Optionally a Backoff Indicator (BI) parameter in the random access backoff indicator corresponds to different time values for the different categories of user equipments.

Optionally the indicating module is further configured to indicate a plurality of BI values in the random access backoff indicator of a random access response, wherein the BI values are determined according to user demands and/or user equipment categories of the user equipments.

Optionally the indicating module is further configured to indicate the BI values of the user equipments by carrying indicators of a plurality of categories of user equipments, and BI parameters respectively corresponding to the categories of user equipments in a Media Access Control (MAC) sub-header.

Optionally the indicating module is further configured: before the random access backoff indicator is sent, to categorize the user equipments, and to apply different backoff parameters to the different categories of user equipments, wherein the indicating module is configured to categorize the user equipments according to one or more of the categories of the user equipments, Quality of service Class Identifier (QCI) demands of user equipment services or user equipment user services, and networks serving the user equipments or the user equipment services, or Radio Area Network (RAN)-side slices of the user equipments or the user equipment services; and/or when there are a plurality of services of a user equipment, to determine a service demand for triggering a random access as the current demand of the user equipment, and to categorize the user equipment according to the service demand.

Optionally the indicating module configured, after the user equipment is categorized, to select a BI value corresponding to the category of user equipment, and to indicate the BI value in the random access backoff indicator of a random access response is further configured: to indicate a backoff threshold to the user equipment so that the user equipment calculates an instance of time for reinitiating a random access, in a uniformly distributed algorithm when the BI value of the user equipment indicated by the random access backoff indicator is below the backoff threshold, and to calculate an instance of time for reinitiating a random access, in a non-uniformly-distributed algorithm when the of the user equipment indicated by the random access backoff indicator is above the backoff threshold; or to indicate an access factor to the user equipment, wherein if there is a shorter delay required of the user equipment, then there will be a higher access probability of the user equipment indicated by the access factor.

In a fifth aspect, an embodiment of the invention provides a user equipment including: a processor, a transceiver, and a memory, wherein the transceiver is configured to transmit and receive data under the control of the processor, and the processor is configured to read and execute program in the memory to perform the method according to any one of the options in the first aspect above.

In a sixth aspect, an embodiment of the invention provides a base station including: a processor, a transceiver, and a memory, wherein the transceiver is configured to transmit and receive data under the control of the processor, and the processor is configured to read and execute program in the memory to perform the method according to any one of the options in the second aspect above.

In a seventh aspect, an embodiment of the invention provides a computer readable storage medium storing computer executable instructions configured to cause the computer to perform the method according to any one of the options in the first aspect above.

In an eighth aspect, an embodiment of the invention provides a computer readable storage medium storing computer executable instructions configured to cause the computer to perform the method according to any one of the options in the second aspect above.

In the technical solutions according to the embodiments of the invention, the base station deciding to send a random access backoff indicator can indicate different backoff parameters applicable to different categories of user equipments so that they reinitiate a random access after their random accesses fail; and each user equipment can initiate a random access according to its category and/or the random access backoff indicator sent by the base station. Since the backoff procedure and the procedure of initiating a random access are performed taking into account the category of user equipment, and other user demands, such a problem can be addressed that the existing random access backoff mechanism can not satisfy the existing variety of user demands, and such a problem can be further addressed that the UE may not access a network quickly so that subsequent service data may be blocked from being transmitted.

BRIEF DESCRIPTION OF THE DRAWINGS

The drawings described here are intended to provide further understanding of the invention, and constitute a part of the specification, and the exemplary embodiments of the invention, and the description thereof are intended to set forth the invention, but not intended to limit the invention unduly. In the drawings.

DETAILED DESCRIPTION OF THE EMBODIMENTS

The inventors have identified during making of the invention that:

The existing random access backoff mechanism is applied to all the user equipments, but a diversity of user demands are introduced in a Next-generation Radio (NR) system so that there are different reliable delays required of different user equipments, and for example, a user equipment for which a quick access is required, e.g., a Ultra-Reliable and Low-Latency Communication (URLLC) user equipment, may not access a network quickly in this mechanism so that subsequent service data may be blocked from being transmitted.

Hereupon the embodiments of the invention provide a technical solution to satisfying a diversity of user equipment and service demands in the NR system, and with this solution, a subsequent random access procedure can be initiated efficiently after a random access fails, so that a quick access of a user equipment with a demand for a short delay can be guaranteed but also random access resources can be accessed uniformly to thereby lower the collision probability of the random access so as to maximize the success ratio of the random access. Particular embodiments of the invention will be described below with reference to the drawings.

In the following description, implementations at the user equipment side and the base station side will be described respectively, where some solution is implemented at only the user equipment side, some solution is implemented at only the base station side, and some solution is implemented at both the user equipment side and the base station side, as described below respectively; and then examples of the implementations will be further described for better understanding of the implementations of the solutions according to the embodiments of the invention.

Figure 4:
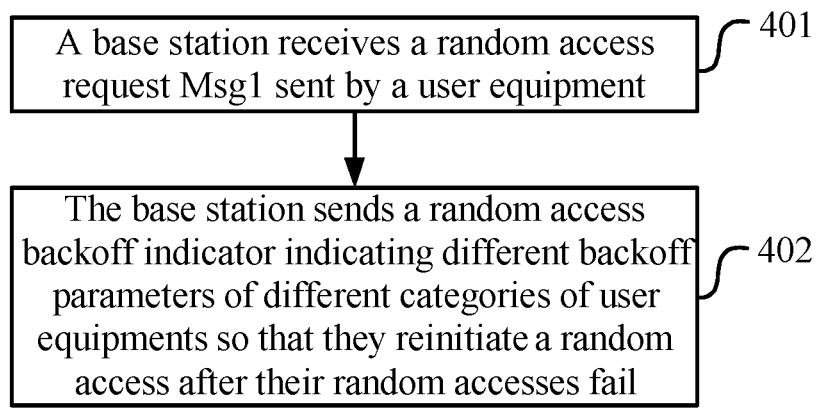
FIG. 4 is a schematic flow chart of an implementation of a method for indicating a random access backoff at the base station side according to an embodiment of the invention.

FIG. 4 is a schematic flow chart of an implementation of a method for indicating a random access backoff at the base station side, and as illustrated, the flow can include the following steps.

In the step 401, a base station receives a random access request sent by a user equipment, where the random access request is an Msg1 message;

In the step 402, the base station sends a random access backoff indicator indicating different backoff parameters of different categories of user equipments so that they reinitiate a random access after their random accesses fail.

Figure 5:
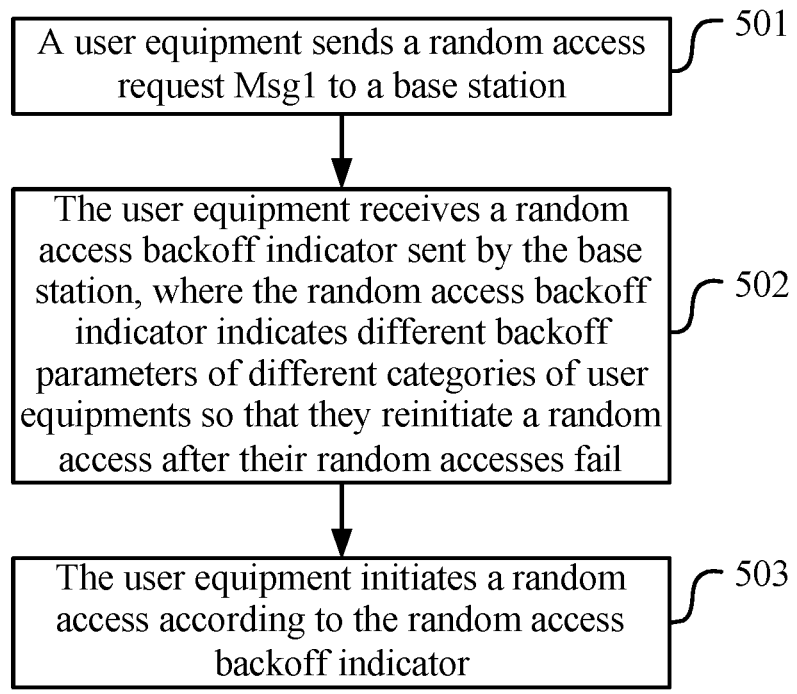
FIG. 5 is a schematic flow chart of an implementation of a method for a random access after a random access backoff at the user equipment side according to an embodiment of the invention.

FIG. 5 is a schematic flow chart of an implementation of a method for a random access after a random access backoff at the user equipment side, and as illustrated, the flow can include the following steps.

In the step 501, a user equipment sends a random access request to a base station, where the random access request is an Msg1 message;

In the step 502, the user equipment receives a random access backoff indicator sent by the base station, where the random access backoff indicator indicates different backoff parameters of different categories of user equipments so that they reinitiate a random access after their random accesses fail;

In the step 503, the user equipment initiates a random access according to the random access backoff indicator.

In an implementation, the user equipments with different demands apply the different backoff parameters after their random accesses fail, so that a user equipment with a short delay can access a network quickly.

In an implementation, before the base station sends the random access backoff indicator, the base station can further categorize the user equipments, and apply the different backoff parameters to the different categories of user equipments, where categorizing the user equipments can include: categorizing the user equipments according to one or more of: the categories of the user equipments, QCI demands of user equipment user services, QCI demands of user equipment services, networks serving the user equipments, networks serving the user equipment services, RAN-side slices of the user equipments, and RAN-side slices of the user equipment services; and/or when there are a plurality of services of a user equipment, determining a service demand for triggering a random access as the current demand of the user equipment, and categorizing the user equipment according to the service demand.

Particularly the user equipments are categorized in one or more of the following implementations so that the different backoff parameters will be applicable to the different categories of user equipments.

In a first implementation, the user equipments are categorized differently, and the different backoff parameters are applicable to the different categories of user equipments, where they are categorized according to one or more of the categories of the user equipments, QCI demands of user equipment services or user equipment user services, and networks serving the user equipments or the user equipment services, or RAN-side slices of the user equipments or the user equipment services.

The user equipments are categorized according to the categories of the user equipments, e.g., an Enhanced Machine Type Communication (eMTC) user equipment or a URLLC user equipment, and/or QCI demands of user equipment services or user equipment user services, and/or networks serving the user equipments or the user equipment services, or RAN-side slices of the user equipments or the user equipment services. A user equipment with a short delay, or a user equipment with a short-delay service can be defined as a user equipment with a high priority.

In a second implementation, when there are a plurality of services of a user equipment, a service demand for triggering a random access is determined as the current demand of the user equipment, the user equipment is categorized according to the service demand, and an applicable backoff parameter is determined.

When there are a plurality of services of a user equipment, an applicable backoff parameter is determined according to a service demand for triggering a random access, and for example, a backoff parameter with the shortest delay is applicable to the user equipment with an URLLC service, and a backoff parameter with a long delay is only applicable to the user equipment with a service for which a short delay is not required.

Several implementations will be described below in which a random access backoff is indicated at the base station side, and/or a new random access is reinitiated at the user equipment side.

First Implementation

In this implementation, when a user of the user equipment is a user with a short delay, BI is ignored, and a random access is initiated over a proximate resource.

At the base station side, a default backoff parameter of a specific user equipment is set to 0 in the random access backoff indicator, where the user equipment is a user equipment with a short delay, or a user equipment with a short-delay service.

At the user equipment side: when a default backoff parameter in the random access backoff indicator is 0, and the user equipment is a user equipment with a short delay, or a user equipment with a short-delay service, it initiates a random access over a proximate resource.

Figure 1:
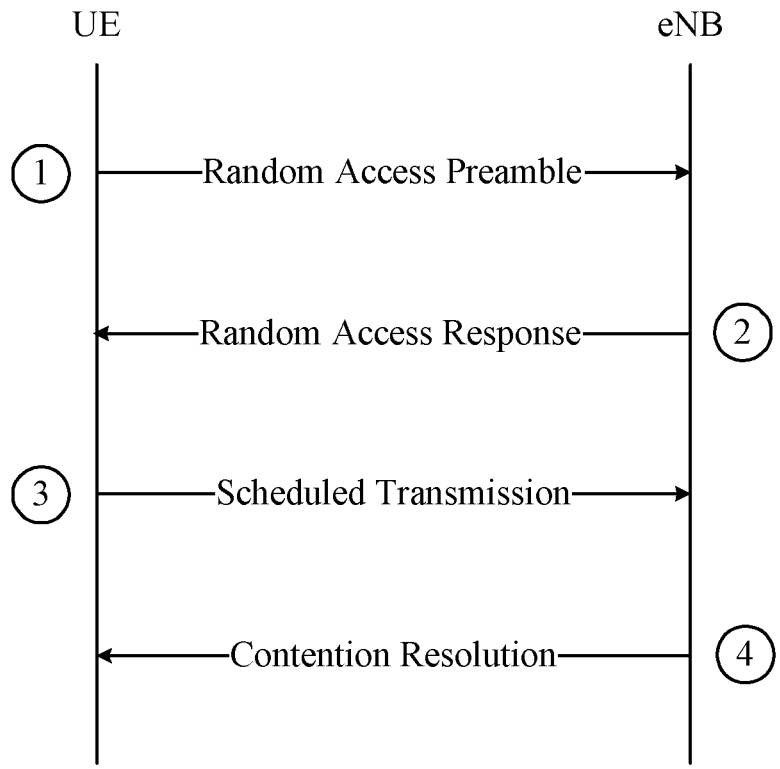
FIG. 1 is a schematic flow chart or the contention-based random access in the prior art.
Figure 2:
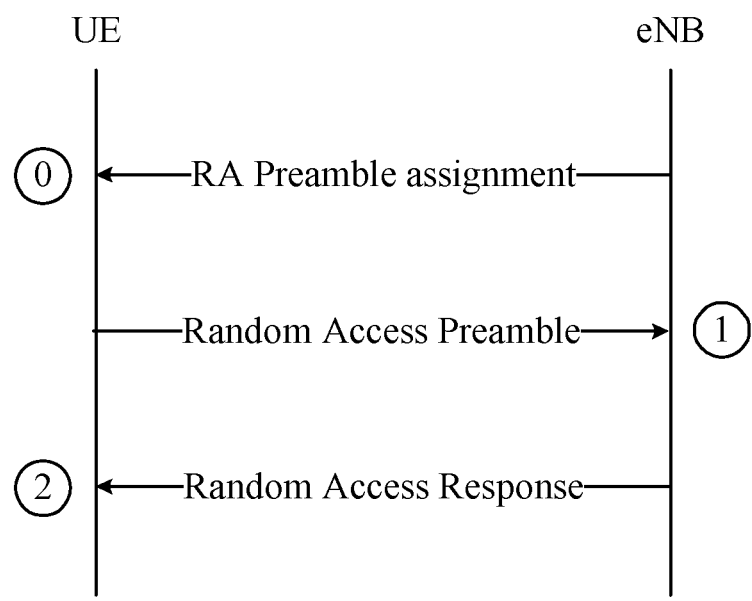
FIG. 2 is a schematic flow chart or the non-contention-based random access in the prior art.
Figure 3:
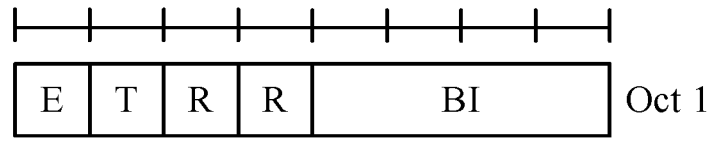
FIG. 3 is a schematic structural diagram of the MAC sub-header including E, T, R, R, and BI in the prior art.

Alternatively in an implementation, for a user equipment with a short delay, i.e., a user equipment for which a short delay is required, after it fails to access, it ignores the backoff indicator, and reinitiates an attempt on a random access, that is, sends Msg1, immediately. The BI MAC sub-header at this time can be as illustrated in FIG. 3.

A particular implementation can be as follows.

First Embodiment

In this example, for a specific category of user equipment, the user equipment itself can ignore the backoff indicator, or of course, it can alternatively initiate a random access over a proximate resource when the default backoff parameter in the random access backoff indicator is 0.

At the base station side, a random access request (Msg1) sent by the user equipment in the cell is received, a backoff indicator is sent in a random access response (Msg2) according to the density of user equipments, and their collision probability and random access resource condition to indicate a time parameter for the user equipment failing with a random access to initiate an attempt on the next random access, for example, the default backoff parameter is indicated to 0.

At the user equipment side, the user equipment determines its category of user equipment, and if it is a user equipment for which a short access delay is required strictly, then it may ignore the backoff parameter, and initiate an attempt on the next random access upon determining that the random access fails; or if the user equipment determines that the default backoff parameter in the random access backoff indicator is 0, then it will initiate a random access over a proximate resource. If the user equipment is a user equipment for which a short delay is not required strictly, then after the random access fails, it will calculate an instance of time for an attempt on the next random access according to the BI parameter sent by the base station side, and initiate a random access.

Second Implementation

In this example, the base station allocates different random access resources for the different categories of user equipment, and allocates a backoff indicator for a user equipment of a corresponding category and with a corresponding demand according to a random access resource over which a random access request is received.

At the Base Station Side

The random access backoff indicator is allocated for a user equipment of a corresponding category and with a corresponding demand according to a random access resource over which a random access request is received, where the base station pre-allocates different random access resources for the different categories of user equipment.

Particularly the base station determines an RA-RNTI according to a received PRACH resource time-frequency position, and schedules a random access response using RA-RNTI to be sent in a random access response window, where the random access response carries a BI for a user demand of the user equipment, and the PRACH resource time-frequency position is pre-allocated by the base station for each different category of user equipment.

At the User Equipment Side

The random access request (Msg1) is sent to the base station over the corresponding random access resource among the different random access resources pre-allocated by the base station for the different categories of user equipments, according to the category of user equipment.

Particularly the corresponding PRACH resource time-frequency position is determined according to the user demand of the user equipment, Msg1 is sent at that position, and after the random access response is received using the RA-RNTI in the random access response window, a random access is initiated according to the BI carried in the random access response.

In an implementation, the base station configures the different random access resources (PRACH resources) for user equipments for which different delays are required, and the base station determines the RA-RNTI according to the received PRACH resource time-frequency position, and schedules the random access response including the backoff indicator BI using the RA-RNTI, where only the user equipment which sent Msg1 over the time-frequency resource follows the backoff indicator. In this way, the network side can determine the delay required of the user equipment according to the PRACH resource position, and indicate a reasonable length of backoff time parameter. The user equipments for which the different delays are required send their random access requests (Msg1) over the different PRACH resources, and they can determine their positions and RA-RNTIs for receiving their random access responses, and receive their corresponding BIs. In this solution, the random access time-frequency resources of the user equipments with the different demands are completely separately from each other. The BI MAC sub-header at this time can be as illustrated in FIG. 3.

A particular implementation can be as follows.

Second Embodiment

In this example, user equipments with different demands are configured with different random access resources (time-frequency resources) to thereby receive different BI values.

At the Base Station Side

In the first step, the base station allocates two or more groups of random access resources, where each group of random access resources includes time-frequency resource positions which do not overlap with each other, and each group of time-frequency resources corresponds to one category of user equipments.

In the second step, the base station receives a random access request (Msg1) over a configured random access time-frequency resource, determines a category of user equipment according to the position of the random access time-frequency resource, and determines a user equipment demand, where the demand is a delay demand.

In the third step, if the base station can not be accessed by the user equipment, then it will determine a random access response window according to the time-frequency resource over which the user equipment sends the random access request (Msg1), calculate an RA-RNTI according to the position of the time-frequency resource, and schedule a random access response using the RA-RNTI to be sent in the random access response window, where the random access response carries a BI for the user equipment or the category of user equipment.

At the User Equipment Side

In the first step, the user equipment receives a configured group of random access resources sent by the base station side, where different groups of random access resources corresponding to different categories of user equipments.

In the second step, the user equipment selects a proximate random access time-frequency resource from the corresponding group of random access resources according to its category and service demand, and sends a random access request.

In the third step, the user equipment determines a random access response window, and calculates an RA-RNTI for receiving a random access response, according to the time-frequency resource over which the random access request (Msg1) is sent, and receives the random access response using the RA-RNTI in the random access response window, and if the random access response carries a BI, then after the random access fails, the user equipment will calculate an instance of time for reinitiating an attempt on a random access, using the BI, and initiate the attempt on a new random access.

Third Implementation

In this example, the base station sends a backoff indicator to the user equipment, where there are different mapping tables of the BI indicator field for different categories of user equipments, and the same BI parameter can be mapped to the different time values for different categories of user equipments.

At the Base Station Side

The BI parameter in the random access backoff indicator corresponds to different time values for the different categories of user equipments.

Particularly the base station generates a random access backoff indicator according to the value of the backoff delay parameter in the BI value, where the values of the backoff delay parameter are mapped to the different categories of user equipments.

At the User Equipment Side

In order to initiate a random access according to the random access backoff indicator, the base station presets different time values corresponding to the BI parameter in the random access backoff indicator for the different categories of user equipments, so the user equipment determines the time value corresponding to the BI parameter in the random access backoff indicator according to the category of user equipment, and then initiates the random access according to the time value.

Particularly the value of the backoff delay parameter in the BI value is calculated according to the mapping relationship between the category of user equipment, and the value of the backoff delay parameter, and the random access is initiated at the instance of time determined according to the value of the backoff delay parameter.

For example, the base station indicates a BI value mapped to different values of the backoff delay parameter for user equipments with different demands, and for example, BI=1 represents 10 ms in a legacy LTE system, and may represent a shorter delay, e.g., 1 ms, for a user equipment with a short delay in an NR system.

A particular implementation can be as follows

Third Embodiment

In this example, the same BI value is mapped to different time values for user equipments with different demands.

At the base station side: a random access request (Msg1) sent by the user equipment in the cell is received, and a backoff indicator is sent in a random access response Msg2 according to the density of user equipments, and their collision probability and random access resource condition to indicate a time parameter for the user equipment failing with a random access to initiate an attempt on the next random access.

At the user equipment side: the user equipment determines its category of user equipment, and calculates a backoff delay parameter corresponding to the BI field according to the category of user equipment, and for example, BI=1 is interpreted by a user equipment for which a short delay is not required, as 10 ms, and a user equipment for which a short delay is required, as 1 ms. After a random access fails, the user equipment calculates an instance of time for reinitiating an attempt on a random access, according to the interpreted backoff delay parameter, and initiates an attempt on a new random access.

In this embodiment, the base station may be ignorant of the category of user equipment.

Fourth Implementation

In this example, the base station indicates a plurality of BI values in a random access backoff indicator of a random access response, where the BI values are determined according to user demands of user equipments, and/or the categories of the user equipments.

Particularly as described above, the user equipments are categorized so that different backoff parameters are applicable to the different categories of user equipments, that is, the user equipments are categorized differently, and the different backoff parameters are applicable to the different categories of user equipments, where they are categorized according to one or more of the categories of the user equipments, QCI demands of user equipment services or user equipment user services, and networks serving the user equipments or the user equipment services, or RAN-side slices of the user equipments or the user equipment services; and/or when there are a plurality of services of a user equipment, a service demand for triggering a random access is determined as the current demand of the user equipment, the user equipment is categorized according to the service demand, and an applicable backoff parameter is determined.

At the Base Station Side

The base station indicates a plurality of BI values in a random access backoff indicator of a random access response, where the BI values are determined according to user demands of user equipments, and/or the categories of the user equipments.

At the User Equipment Side

In order to initiate a random access according to the random access backoff indicator, the random access is initiated according to a BI value determined among the plurality of BI values in the backoff indicator of the random access response according to a user demand of the user equipment, and/or the category of the user equipment.

In an implementation, the base station indicates the plurality of BI values in the random access backoff indicator of the random access response by carrying an indicator of a category of user equipment, and a BI parameter corresponding to the category of user equipment in the MAC sub-header to indicate the BI value of the category of user equipment.

Alternatively in an implementation, a user equipment priority indicator of a category of user equipment, and a BI parameter corresponding to the category of user equipment can be carried in the MAC sub-header.

Figure 6:
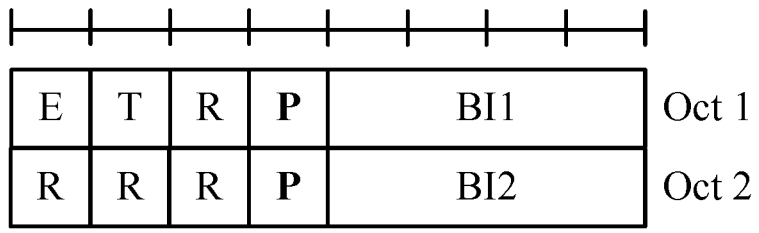
FIG. 6 is a schematic diagram of an MAC sub-header 1 including a plurality of BI values according to an embodiment of the invention.
Figure 7:
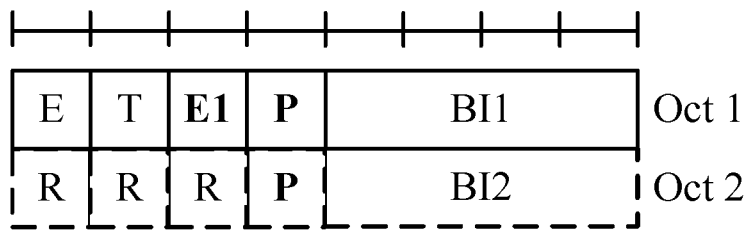
FIG. 7 is a schematic diagram of an MAC sub-header 2 including a plurality of BI values according to an embodiment of the invention.

In an implementation, the base station indicates the plurality of BI values in the backoff indicator of the random access response, and specifies the categories of user equipments corresponding to the BI values. In this implementation, the BI MAC sub-header shall be modified to indicate the plurality of BI values. FIG. 6 is a schematic diagram of an MAC sub-header 1 indicating a plurality of BI values, and FIG. 7 is a schematic diagram of an MAC sub-header 2 indicating a plurality of BI values. The MAC sub-header indicating the plurality of BI values can be as illustrated in FIG. 6 or FIG. 7, where in FIG. 6, two BI fields are carried, "P" represents a corresponding category or priority of user equipment, and "BI1" and "BI2" represent backoff indicators of the different categories of user equipments; and in FIG. 7, there may be one or more backoff indicators, and the "E1" field indicates whether there is another subsequent BI value.

A particular implementation can be as follows.

Fourth Embodiment

In this example, a plurality of BI values for user equipments with different demands are carried in a random access response, and a BI MAC sub-header in this example can be as illustrated in FIG. 6 or FIG. 7.

At the base station side: a random access request (Msg1) sent by the user equipment in the cell is received, and a backoff indicator is sent in a random access response Msg2 according to the density of user equipments, and their collision probability and random access resource condition to indicate time parameters for different categories of user equipments failing with a random access to initiate an attempt on the next random access, where the BI MAC sub-header carries indicators of the priorities of the categories of user equipments, and BI parameters corresponding to the respective priorities, and the values of a real delay parameter to which the BI parameters corresponding to the different categories of user equipments are mapped may or may not be the same. Stated otherwise, the base station indicates a plurality of BI values in the random access backoff indicator of the random access response by carrying indicators of the priorities of user demands of the categories of user equipments, and the BI parameters corresponding to the respective priorities corresponding to the BI values of the categories of user equipments, in the MAC sub-header.

At the user equipment side: the user equipment determines its category of user equipment, reads a corresponding BI field according to the category of user equipment, and the priority thereof, and maps it to the value of the backoff delay parameter. After a random access fails, the user equipment calculates an instance of time for reinitiating an attempt on a random access, according to the obtained backoff delay parameter, and initiates an attempt on a new random access. Stated otherwise, the user equipment determines the BI values of the user equipment according to the correspondence relationship between the user demand of the user equipment, and the BI value, and initiates the random access according to the BI value, by determining the BI value of the user equipment according to the indicator of the priority of the user demand of the user equipment, and the BI parameter corresponding to the priority, carried in the MAC subheader.

Fifth Implementation

At the Base Station Side

After the base station determines the category of user equipment, it selects the BI value corresponding to the category of user equipment, and indicates the BI value in the random access backoff indicator of the random access response, and at this time, the base station can further indicate a backoff threshold to the user equipment so that the user equipment calculates an instance of time for reinitiating a random access, in a uniformly distributed algorithm when the BI value is below the backoff threshold, or calculates an instance of time for reinitiating a random access, in a non-uniformly-distributed algorithm when the BI value is above the backoff threshold; or the base station can indicate an access factor to the user equipment, where if there is a shorter delay required of the user equipment, then there will be a higher access probability of the user equipment indicated by the access factor.

At the User Equipment Side

The user equipment can further receive the backoff threshold indicated by the base station to the user equipment, and calculate an instance of time for reinitiating a random access, in a uniformly distributed algorithm when the BI value is below the backoff threshold, or calculate an instance of time for reinitiating a random access, in a non-uniformly-distributed algorithm when the BI value is above the backoff threshold; or the user equipment can further receive the access factor indicated by the base station to the user equipment, and revise the BI value according to the access factor, where if there is a shorter delay required of the user equipment, then there will be a higher access probability of the user equipment indicated by the access factor.

In an implementation, after the plurality of BI values are introduced for the different categories of user equipments, there may be such a problem that random access resources are accessed so non-uniformly that there is a higher collision probability of random access requests (Msg1). For example, two BIs are indicated in a sub-frame 1, where one BI corresponds to T1, and the other BI corresponds to T2, where T1<T2; and for example, both a user equipment with a short delay, and a normal delay receive a backoff indicator of this instance of time, fail with a random access, and need to initiate a random access, so the probability that Msg1 is initiated is 1/T1+1/T2 at any instance of time in the period of time from 0 to T1, and is 1/T2 at any instance of time in the period of time from T1 to T2 after the random access fails. In order to address this problem, any one of the following implementations is optional.

In a first implementation, an instance of time for resending Msg1 is selected in different algorithms for different backoff values indicated by the BI; and for example, a backoff threshold Th is set, and when a backoff value T corresponding to the BI is below Th, an instance of time for resending Msg1 is calculated in a uniformly distributed algorithm, or when T is above Th, an instance of time for resending Msg1 is calculated in a non-uniformly-distributed algorithm, so that the probability that the instance of time is selected in the first part of a period of time is lower than the probability that the instance of time is selected in the last part of the period of time.

In a second implementation, an access factor F is introduced, and the backoff parameter is revised according to the access factor, where there is a larger access factor, etc., 1, of a user equipment with a short delay, and there is a smaller access factor of a user equipment for which a short delay is not required strictly, in the first part of a period of time so that there is a lower probability that a random access is initiated in the first half of the period of time. If there is only one BI value, then the access factor will be 1 for all the user equipments.

A particular implementation can be as follows.

Fifth Embodiment

In this example, user equipments with different demands select an instance of time for reinitiating a random access, in different algorithms (dependent upon a threshold).

In an implementation, after a user demand of the user equipment is determined, the base station selects a BI value corresponding to the user demand, and indicates the BI value in a random access backoff indicator of a random access response, and at this time, the base station can further indicate a backoff threshold to the user equipment. The user equipment calculates an instance of time for reinitiating a random access, in a uniformly distributed algorithm when the BI parameter of the user equipment is below the backoff threshold, or calculates an instance of time for reinitiating a random access, in a non-uniformly-distributed algorithm when the BI parameter of the user equipment is above the backoff threshold.

When the user equipment initiates a random access according to the correspondence relationship between the user demand of the user equipment, and the BI value and the random access instance of time algorithm, the user equipment further receives the backoff threshold indicated by the base station to the user equipment, and calculates an instance of time for reinitiating a random access, in a uniformly distributed algorithm when the BI parameter of the user equipment is below the backoff threshold, or calculates an instance of time for reinitiating a random access, in a non-uniformly-distributed algorithm when the BI parameter of the user equipment is above the backoff threshold.

In the first step, the user equipment receives a threshold BITh of the backoff indicator algorithm, where the threshold can be carried in a system message or the random access response.

In the second step, the user equipment initiates a random access procedure, and if a BI parameter is received, then it will calculate and store a backoff delay parameter corresponding thereto;

In the third step, after a random access fails, the user equipment compares the received BI parameter with the threshold BITh, and if the BI parameter is below the threshold, then it may calculate an instance of time for attempting on the next random access, in a uniformly distributed algorithm; if the BI parameter is above the threshold, then it may calculate the instance of time in a non-uniformly-distributed algorithm, so that the probability that a point of time proximate to the instance of time when the current random access fails is selected is lower than the probability that a point of time far from the instance of time when the current random access fails is selected.

Sixth Embodiment

In this example, user equipments with different demands select an instance of time for reinitiating a random access, in different algorithms (dependent upon whether there are a plurality of BI parameters).

In an implementation, after a user demand of the user equipment is determined, the base station selects a BI parameter value corresponding to the user demand, and indicates the BI value in a random access backoff indicator of a random access response, and at this time, the base station can further indicate an access factor to the user equipment, where if there is a shorter delay required of the user equipment, then there will be a higher access factor.

When the user equipment initiates a random access according to the correspondence relationship between the user demand of the user equipment, and the BI value and the random access instance of time algorithm, the user equipment further receives the access factor indicated by the base station to the user equipment, and revise the BI parameter of the user equipment according to the access factor.

In the first step, the user equipment initiates a random access procedure, and if the random access response carrying a plurality of BI fields are received, then it will determine a valid BI field of the user equipment according to the category of user equipment, and map the BI field to a corresponding value of the backoff delay parameter;

In the second step, after a random access fails, if the backoff delay parameter with a smaller value is applicable to the category of user equipment, then the user equipment may calculate an instance of time for initiating an attempt on the next random access, in a uniformly distributed algorithm, or if the backoff delay parameter with a larger value is applicable to the category of user equipment, then the user equipment may calculate an instance of time for initiating an attempt on the next random access, in a non-uniformly-distributed algorithm, so that the probability that a point of time proximate to the instance of time when the current random access fails is selected is lower than the probability that a point of time far from the instance of time when the current random access fails is selected.

Based upon the same inventive idea, embodiments of the invention further provide a base station-side device and a user equipment in a long term evolution multi-carrier advanced system, and a long term evolution multi-carrier advanced system, and since these devices address the problem under a principle to the method for a random access after a random access backoff, and the method and device for allocating dynamically reserve resources in uplink control channel in a long term evolution-advanced system, reference can be made to the implementations of the methods for implementations of these devices, and a repeated description thereof will be omitted here.

Figure 8:
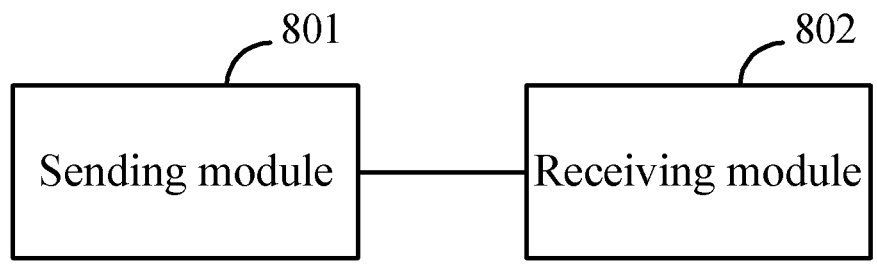
FIG. 8 is a schematic structural diagram of a device for a random access after a random access backoff at the user equipment side according to an embodiment of the invention.

FIG. 8 is a schematic structural diagram of a device for a random access after a random access backoff according to an embodiment of the invention, and as illustrated, the device can include the following.

A sending module 801 is configured to send a random access request Msg1 to a base station;

A receiving module 802 is configured to receive a random access backoff indicator sent by the base station, where the random access backoff indicator indicates different backoff parameters of different categories of user equipments so that they reinitiate a random access after their random accesses fail;

The sending module 801 is further configured to initiate a random access according to the random access backoff indicator.

In an implementation, the sending module is further configured to initiate a random access over a proximate resource when a default backoff parameter in the random access backoff indicator is 0, where the default backoff parameter in the random access backoff indicator is 0 for a specific user equipment which is a user equipment with a short delay, or a user equipment with a short-delay service.

In an implementation, the sending module configured to send the random access request Msg1 to the base station is further configured to send the random access request Msg1 over a random access resource corresponding to a category of user equipment among the different random access resources pre-allocated by the base station for the different categories of user equipments.

In an implementation, the sending module configured to initiate the random access according to the random access backoff indicator is further configured, when the base station presets different time values corresponding to the BI parameter for the different categories of user equipment, to determine a time value corresponding to the BI parameter in the random access backoff indicator according to a category of user equipment, and to initiate the random access according to the time value.

In an implementation, the sending module configured to initiate the random access according to the random access backoff indicator is further configured to initiate the random access according to a BI value determined according to a user demand of the user equipment, and/or the category of user equipment among a plurality of BI values indicated in the backoff indicator of a random access response.

In an implementation, the sending module is configured to initiate the random access according to the random access backoff indicator when the base station indicates the plurality of BI values in the random access backoff indicator of the random access response by carrying indicators of the categories of user equipments, and BI parameters corresponding to the categories of user equipments in an MAC subheader.

In an implementation, the user equipment is categorized according to one or more of a category of user equipment, a QCI demand of a user equipment user service, a QCI demand of a user equipment service, a network serving the user equipment, a network serving the user equipment service, an RAN-side slice serving the user equipment, and an RAN-side slice serving the user equipment service; and/or when there are a plurality of services of the user equipment, a service demand for triggering a random access is determined as the current demand of the user equipment, and the user equipment is categorized according to the service demand.

In an implementation, the receiving module is further configured to receive a backoff threshold indicated by the base station to the user equipment, and the sending module is further configured to calculate an instance of time for reinitiating a random access, in a uniformly distributed algorithm when the BI parameter is below the backoff threshold, and to calculate an instance of time for reinitiating a random access, in a non-uniformly-distributed algorithm when the BI parameter is above the backoff threshold; or the receiving module is further configured to receive an access factor indicated by the base station to the user equipment, and the sending module is further configured to revise the BI value according to the access factor, where if there is a shorter delay required of the user equipment, then there will be a higher access probability of the user equipment indicated by the access factor indicated by the base station.

Figure 9:
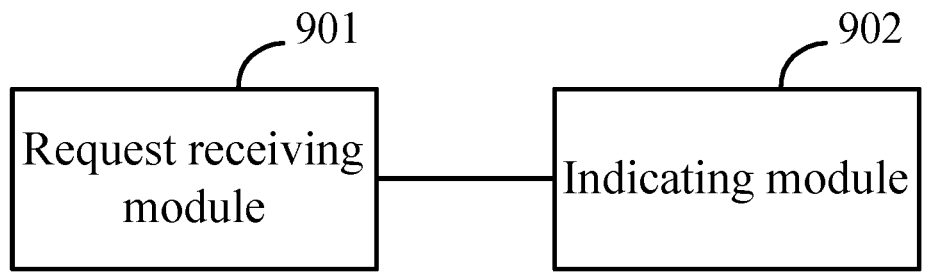
FIG. 9 is a schematic structural diagram of a device for indicating a random access backoff at the base station side according to an embodiment of the invention.

FIG. 9 is a schematic structural diagram of a device for indicating a random access backoff at the base station side according to an embodiment of the invention, and as illustrated, the device can include the following.

A request receiving module 901 is configured to receive a random access request Msg1 sent by a user equipment; and An indicating module 902 is configured to send a random access backoff indicator indicating different backoff parameters of different categories of user equipments so that they reinitiate a random access after their random accesses fail.

In an implementation, the indicating module is further configured to set a default backoff parameter of a specific user equipment to 0 in the random access backoff indicator, where the specific user equipment is a user equipment with a short delay, or a user equipment with a short-delay service.

In an implementation, the random access backoff indicator is allocated for each user equipment from which the random access request is received over a corresponding random access resource, and which has a corresponding demand, where different random access resources are pre-allocated for the different categories of user equipments.

In an implementation, the BI parameter in the random access backoff indicator corresponds to different time values for the different categories of user equipments.

In an implementation, the indicating module is further configured to indicate a plurality of BI values in the random access backoff indicator of a random access response, where the BI values are determined according to user demands and/or user equipment categories of the user equipments.

In an implementation, the indicating module configured to indicate the plurality of BI values in the random access backoff indicator of the random access response is further configured to indicate the BI values of the user equipments by carrying indicators of the categories of user equipments, and BI parameters corresponding to the categories of user equipments in an MAC sub-header.

In an implementation, before the random access backoff indicator is sent, the indicating module is further configured to categorize the user equipments, and to apply different backoff parameters to the different categories of user equipments, where the indicating module is configured to categorize the user equipments according to one or more of the categories of the user equipments, QCI demands of user equipment services or user equipment user services, and networks serving the user equipments or the user equipment services, or RAN-side slices of the user equipments or the user equipment services; and/or when there are a plurality of services of a user equipment, to determine a service demand for triggering a random access as the current demand of the user equipment, and to categorize the user equipment according to the service demand.

In an implementation, after a user equipment is categorized, the indicating module configured to select a BI value corresponding to the category of user equipment, and to indicate the BI value in the random access backoff indicator of the random access response is further configured to indicate a backoff threshold to the user equipment so that the user equipment calculates an instance of time for reinitiating a random access, in a uniformly distributed algorithm when the BI value is below the backoff threshold, and to calculate an instance of time for reinitiating a random access, in a non-uniformly-distributed algorithm when the BI value is above the backoff threshold; or to indicate an access factor to the user equipment, where if there is a shorter delay required of the user equipment, then there will be a higher access probability of the user equipment indicated by the access factor.

For the sake of a convenient description, the respective components of the devices above have been functionally described respectively as respective modules or units. Of course, the functions of the respective modules or units can be performed in the same one or more pieces of software or hardware in an implementation of the invention.

The technical solutions according to the embodiments of the invention can be embodied as follows.

Figure 10:
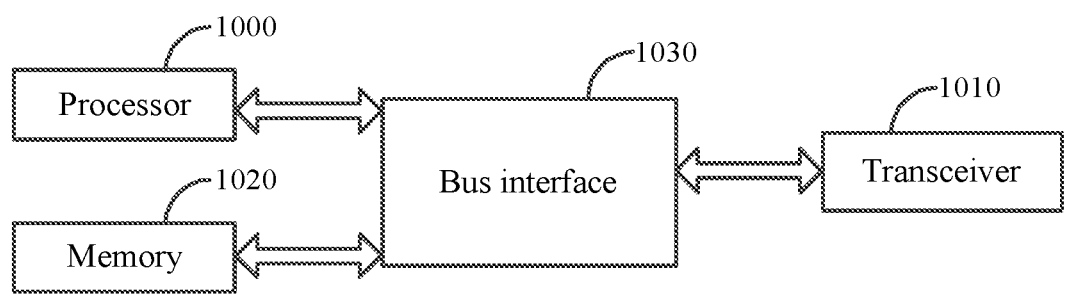
FIG. 10 is a schematic structural diagram of a base station according to an embodiment of the invention.

FIG. 10 is a schematic structural diagram of a base station according to an embodiment of the invention, and as illustrated, the base station includes the following.

A processor 1000 is configured to read and execute program in a memory 1020:

To process data as needed for a transceiver; and

The transceiver 1010 is configured to transmit and receive data under the control of the processor 1000:

To receive a random access request Msg1 sent by a user equipment; and to send a random access backoff indicator indicating different backoff parameters of different categories of user equipments so that they reinitiate a random access after their random accesses fail.

In an implementation, a default backoff parameter of a specific user equipment is 0 in the random access backoff indicator, where the specific user equipment is a user equipment with a short delay, or a user equipment with a short-delay service.

In an implementation, the random access backoff indicator is allocated for each user equipment from which the random access request is received over a corresponding random access resource, and which has a corresponding demand, where different random access resources are pre-allocated for the different categories of user equipments.

In an implementation, the BI parameter in the random access backoff indicator corresponds to different time values for the different categories of user equipments.

In an implementation, the processor is further configured to indicate a plurality of BI values in the random access backoff indicator of a random access response, where the BI values are determined according to user demands and/or user equipment categories of the user equipments.

In an implementation, the processor configured to indicate the plurality of BI values in the random access backoff indicator of the random access response is further configured to carry indicators of the categories of user equipments, and BI parameters corresponding to the categories of user equipments in an MAC sub-header.

In an implementation, before the random access backoff indicator is sent, the processor is further configured to categorize the user equipments, and to apply different backoff parameters to the different categories of user equipments, where the processor is configured to categorize the user equipments according to one or more of the categories of the user equipments, QCI demands of user equipment services or user equipment user services, and networks serving the user equipments or the user equipment services, or RAN-side slices of the user equipments or the user equipment services; and/or when there are a plurality of services of a user equipment, to determine a service demand for triggering a random access as the current demand of the user equipment, and to categorize the user equipment according to the service demand.

In an implementation, after a user equipment is categorized, the processor configured to select a BI value corresponding to the category of user equipment, and to indicate the BI value in the random access backoff indicator of the random access response is further configured to indicate a backoff threshold to the user equipment so that the user equipment calculates an instance of time for reinitiating a random access, in a uniformly distributed algorithm when the BI value is below the backoff threshold, and to calculate an instance of time for reinitiating a random access, in a non-uniformly-distributed algorithm when the BI value is above the backoff threshold; or to indicate an access factor to the user equipment, where if there is a shorter delay required of the user equipment, then there will be a higher access probability of the user equipment indicated by the access factor.

Here in FIG. 10, the bus architecture can include any number of interconnecting buses and bridges to link together various circuits including one or more processors represented by the processor 1000, and one or more memories represented by the memory 1020. The bus architecture can further link together various other circuits, e.g., a peripheral device, a manostat, a power management circuit, etc., all of which are well known in the art, so a further description thereof will be omitted in this context. The bus interface 1030 serves as an interface. The transceiver 1010 can be a number of elements, e.g., a transmitter and a receiver, which are units for communication with various other devices over a transmission medium. The processor 1000 is responsible for managing the bus architecture and performing normal processes, and the memory 1020 can store data for use by the processor 1000 in performing the operations.

Figure 11:
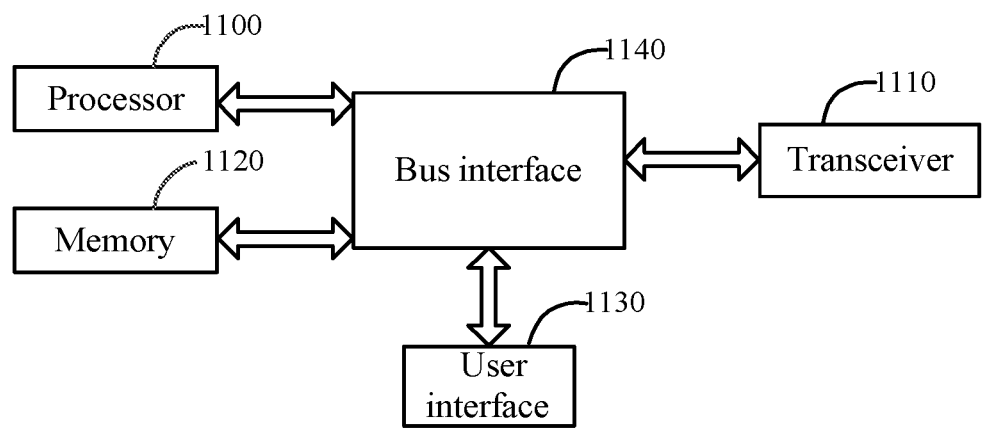
FIG. 11 is a schematic structural diagram of a user equipment according to an embodiment of the invention.

FIG. 11 is a schematic structural diagram of a user equipment according to an embodiment of the invention, and as illustrated, the base station includes: a processor 1100 configured to read and execute program in a memory 1120 to process data as needed for a transceiver; and the transceiver 1110 configured to transmit and receive data under the control of the processor 1100: to send a random access request Msg1 to a base station;

To receive a random access backoff indicator sent by the base station, where the random access backoff indicator indicates different backoff parameters of different categories of user equipments so that they reinitiate a random access after their random accesses fail; and to initiate a random access according to the random access backoff indicator.

In an implementation, the processor is further configured to initiate a random access over a proximate resource when a default backoff parameter in the random access backoff indicator is 0, where the default backoff parameter in the random access backoff indicator is 0 for a specific user equipment which is a user equipment with a short delay, or a user equipment with a short-delay service.

In an implementation, the processor configured to send the random access request Msg1 to the base station is further configured to send the random access request Msg1 over a random access resource corresponding to a category of user equipment among the different random access resources pre-allocated by the base station for the different categories of user equipments.

In an implementation, the processor configured to initiate the random access according to the random access backoff indicator is further configured, when the base station presets different time values corresponding to the BI parameter for the different categories of user equipment, to determine a time value corresponding to the BI parameter in the random access backoff indicator according to a category of user equipment, and to initiate the random access according to the time value.

In an implementation, the processor configured to initiate the random access according to the random access backoff indicator is further configured to initiate the random access according to a BI value determined according to a user demand of the user equipment, and/or the category of user equipment among a plurality of BI values indicated in the backoff indicator of a random access response.

In an implementation, the processor is further configured to initiate the random access according to the random access backoff indicator when the base station indicates the plurality of BI values in the random access backoff indicator of the random access response by carrying indicators of the categories of user equipments, and BI parameters corresponding to the categories of user equipments in an MAC sub-header.

In an implementation, the user equipment is categorized according to one or more of a category of user equipment, a QCI demand of a user equipment user service, a QCI demand of a user equipment service, a network serving the user equipment, a network serving the user equipment service, an RAN-side slice serving the user equipment, and an RAN-side slice serving the user equipment service; and/or when there are a plurality of services of the user equipment, a service demand for triggering a random access is determined as the current demand of the user equipment, and the user equipment is categorized according to the service demand.

In an implementation, the processor is further configured to receive a backoff threshold indicated by the base station to the user equipment, to calculate an instance of time for reinitiating a random access, in a uniformly distributed algorithm when the BI parameter is below the backoff threshold, and to calculate an instance of time for reinitiating a random access, in a non-uniformly-distributed algorithm when the BI parameter is above the backoff threshold; or to receive an access factor indicated by the base station to the user equipment, and the sending module is further configured to revise the BI value according to the access factor, where if there is a shorter delay required of the user equipment, then there will be a higher access probability of the user equipment indicated by the access factor indicated by the base station.

Here in FIG. 11, the bus architecture can include any number of interconnecting buses and bridges to particularly link together various circuits including one or more processors represented by the processor 1100, and one or more memories represented by the memory 1120. The bus architecture can further link together various other circuits, e.g., a peripheral device, a manostat, a power management circuit, etc., all of which are well known in the art, so a further description thereof will be omitted in this context. The bus interface 1140 serves as an interface. The transceiver 1110 can be a number of elements, e.g., a transmitter and a receiver, which are units for communication with various other devices over a transmission medium. For different user equipments, the user interface 1130 can also be an interface via which devices are connected internally and externally as needed, and the connected devices include but will not be limited to a keypad, a monitor, a speaker, a microphone, a joystick, etc.

The processor 1100 is responsible for managing the bus architecture and performing normal processes, and the memory 1120 can store data for use by the processor 1100 in performing the operations.

In summary, in the technical solutions according to the embodiments of the invention, different backoff indicators are applied to user equipments with different demands after their random accesses fail, so that a user equipment with a short delay can access a network quickly. Particularly there are the following solutions.

For a user equipment with a short delay, i.e., a user equipment for which a short delay is required, a default backoff parameter in the random access backoff indicator is 0, or after an random access fails, it ignores the backoff indicator, and reinitiates an attempt on a random access immediately over a proximate resource.

The base station configures different random access time-frequency resources (PRACH resources) for user equipments for which different delays are required, and the base station determines an RA-RNTI according to a received PRACH resource time-frequency position, and schedules an random access response including a backoff indicator BI using the RA-RNTI, where only the user equipment which sent Msg1 over the time-frequency resource follows the backoff indicator. In this way, the network side can determine the delay required of the user equipment according to the PRACH resource position, and indicate a reasonable length of backoff time parameter. The user equipments for which the different delays are required send their random access requests (Msg1) over the different PRACH resources, and they can determine their positions and RA-RNTIs for receiving their random access responses, and receive their corresponding BIs. In this solution, the random access time-frequency resources of the user equipments with the different demands are completely separately from each other.

The base station indicates a BI value, and the user equipments with the different demands map it to different values of the backoff delay parameter.

The base station indicates a plurality of BI values in the backoff indicator of the random access response, and specifies the categories of user equipments corresponding to the BI values.

The user equipments are categorized differently, and different BI values are applicable to the different categories of user equipments.

When there is a plurality of services of a user equipment, an applicable backoff parameter is determined, and for example, a backoff parameter with the shortest delay is applicable to the user equipment with an URLLC service, and a backoff parameter with a long delay is only applicable to the user equipment with a service for which a short delay is not required.

Furthermore there is provided a solution to making the delays of the random access resources uniform when there are a plurality of set of BI parameters.

As can be apparent from the respective solutions above, after a random access fails, a subsequent random access procedure can be initiated in effect so that a user equipment for which a short delay is required can perform a quick access, but also random access resources can be access uniformly to thereby lower an collision probability of random accesses so as to maximize the success ratio of the random access.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for a random access after a random access backoff, the method comprising:
sending, by a user equipment, a random access request to a base station;
receiving, by the user equipment, a random access response from the base station, wherein a random access backoff indicator carried in the random access response indicates different backoff indicator values for different categories of user equipments so that they reinitiate a random access after their random accesses fail; and
initiating, by the user equipment, a random access according to the random access backoff indicator;
wherein the method further comprises:
receiving, by the user equipment, a backoff threshold indicated by the base station, when the backoff indicator value of the user equipment indicated by the random access backoff indicator is below the backoff threshold, then calculating, by the user equipment, an instance of time for reinitiating a random access, in a uniformly distributed algorithm, and when the backoff indicator value of the user equipment indicated by the random access backoff indicator is above the backoff threshold, then calculating, by the user equipment, an instance of time for reinitiating a random access, in a non-uniformly-distributed algorithm.

2. The method according to claim 1, wherein initiating, by the user equipment, the random access according to the random access backoff indicator comprises:
when a default backoff indicator value in the random access backoff indicator is 0, and the user equipment is a user equipment with a short delay, or a user equipment with a short-delay service, then initiating, by the user equipment, a random access over a proximate resource, wherein the default backoff indicator value in the random access backoff indicator is set to 0 for a specific user equipment which is a user equipment with a short delay, or a user equipment with a short-delay service.

3. The method according to claim 1, wherein sending, by the user equipment, the random access request to the base station comprises: sending, by the user equipment, the random access request to the base station over a random access resource corresponding to a category of the user equipment among the different random access resources pre-allocated by the base station for the different categories of user equipments.

4. The method according to claim 1, wherein initiating, by the user equipment, the random access according to the random access backoff indicator comprises: determining, by the user equipment, a time value corresponding to a backoff indicator value in the random access backoff indicator according to a category of the user equipment, and then initiating the random access according to the time value, wherein the backoff indicator value in the random access backoff indicator corresponds to different time values for the different categories of user equipments; or initiating, by the user equipment, the random access according to a backoff indicator value determined according to a user demand of the user equipment, or the category of the user equipment among a plurality of backoff indicator values indicated in the backoff indicator carried in the random access response.

5. The method according to claim 4, wherein the plurality of backoff indicator values are indicated in the random access backoff indicator carried in the random access response by carrying indicators of a plurality of categories of user equipments, and backoff indicators corresponding respectively to the categories of user equipments in a Media Access Control (MAC) sub-header.

6. The method according to claim 1, wherein the user equipment is categorized according to one or more of a category of user equipment, a Quality of service Class Identifier (QCI) demand of a user equipment user service, a QCI demand of a user equipment service, a network serving the user equipment, a network serving the user equipment service, a Radio Access Network (RAN)-side slice serving the user equipment, and an RAN-side slice serving the user equipment service; or when there are a plurality of services of the user equipment, a service demand for triggering a random access is determined as the current demand of the user equipment, and the user equipment is categorized according to the service demand.

7. A system for indicating a random access backoff, comprising a user equipment and a base station, wherein:
the user equipment is configured to: send a random access request to the base station; receive a random access response from the base station, wherein a random access backoff indicator carried in the random access response indicates different backoff indicator values for different categories of user equipments so that they reinitiate a random access after their random accesses fail; and initiate a random access according to the random access backoff indicator;
wherein the user equipment is further configured to: receive a backoff threshold indicated by the base station, when the backoff indicator value of the user equipment indicated by the random access backoff indicator is below the backoff threshold, then calculate an instance of time for reinitiating a random access, in a uniformly distributed algorithm, and when the backoff indicator value of the user equipment indicated by the random access backoff indicator is above the backoff threshold, then calculate an instance of time for reinitiating a random aCCeSS, in a non-uniformly-distributed algorithm;
wherein the base station is configured to: receive the random access request from the user equipment; and send the random access request from a user equipment;
wherein the base station is further configured to: indicate the backoff threshold to the user equipment.

8. The system according to claim 7, wherein a default backoff indicator value of a specific user equipment is set to 0 in the random access backoff indicator, wherein the specific user equipment is a user equipment with a short delay, or a user equipment with a short-delay service.

9. The system according to claim 7, wherein the random access backoff indicator is allocated for each user equipment from which the random access request is received over a corresponding random access resource, and which has a corresponding demand, wherein the base station pre-allocates different random access resources for the different categories of user equipments.

10. The system according to claim 7, wherein before the base station sends the random access response, the base station is further configured to:
categorize the user equipments, and apply different backoff indicator values to the different categories of user equipments,
wherein the base station is configured to categorize the user equipments is further configured to perform at least one of:
categorize the user equipments according to one or more of the categories of the user equipments, Quality of service Class Identifier (QCI) demands of user equipment services or user equipment user services, and networks serving the user equipments or the user equipment services, or Radio Access Network (RAN)-side slices of the user equipments or the user equipment services; or
when there are a plurality of services of a user equipment, determine a service demand for triggering a random access as the current demand of the user equipment, and categorize the user equipment according to the service demand.

11. The system according to claim 7, wherein the user equipment configured to initiate the random access according to the random access backoff indicator is configured to:
when a default backoff indicator value in the random access backoff indicator is 0, and the user equipment is a user equipment with a short delay, or a user equipment with a short-delay service, then initiate a random access over a proximate resource, wherein the default backoff indicator value in the random access backoff indicator is set to 0 for a specific user equipment which is a user equipment with a short delay, or a user equipment with a short-delay service.

12. The system according to claim 7, wherein the user equipment configured to send the random access request to the base station is configured to:
 send the random access request to the base station over a random access resource corresponding to a category of the user equipment among the different random access resources pre-allocated by the base station for the different categories of user equipments.

13. The system according to claim 7, wherein the user equipment configured to initiate the random access according to the random access backoff indicator is configured to:
 determine a time value corresponding to a backoff indicator value in the random access backoff indicator according to a category of the user equipment, and then initiate the random access according to the time value, wherein the backoff indicator value in the random access backoff indicator corresponds to different time values for the different categories of user equipments; or
 initiate the random access according to a backoff indicator value determined according to a user demand of the user equipment, or the category of the user equipment among a plurality of backoff indicator values indicated in the backoff indicator carried in the random access response.

14. The system according to claim 13, wherein the plurality of backoff indicator values are indicated in the random access backoff indicator carried in the random access response by carrying indicators of a plurality of categories of user equipments, and backoff indicators corresponding respectively to the categories of user equipments in a Media Access Control (MAC) sub-header.

15. The system according to claim 7, Wherein the user equipment is categorized according to one or more of a category of user equipment, a Quality of service Class Identifier (QCI) demand of a user equipment user service, a QCI demand of a user equipment service, a network serving the user equipment, a network serving the user equipment service, a Radio Access Network (RAN)-side slice serving the user equipment, and an RAN-side slice serving the user equipment service; or
 when there are a plurality of services of the user equipment, a service demand for triggering a random access is determined as the current demand of the user equipment, and the user equipment is categorized according to the service demand.

16. A user equipment, comprising:
 a processor, a transceiver, and a memory, wherein: the processor is configured to read and execute program in the memory:
 to send a random access request to a base station through the transceiver;
 to receive a random access response from the base station, wherein a random access backoff indicator carried in the random access response indicates different backoff indicator values for different categories of user equipments so that they reinitiate a random access after their random accesses fail; and
 to initiate a random access according to the random access backoff indicator; and the transceiver is configured to transmit and receive data under the control of the processor;
 wherein the processor is further configured to receive a backoff threshold indicated by the base station to the user equipment through the transceiver, to calculate an instance of time for reinitiating a random access, in a uniformly distributed algorithm when the backoff indicator value of the user equipment indicated by the random access backoff indicator is below the backoff threshold, and to calculate an instance of time for reinitiating a random access, in a non-uniformly-distributed algorithm when the backoff indicator value of the user equipment indicated by the random access backoff indicator is above the backoff threshold.

17. The user equipment according to claim 16, wherein the processor is further configured to initiate a random access over a proximate resource when a default backoff indicator value in the random access backoff indicator is 0, and the user equipment is a user equipment with a short delay, or a user equipment with a short-delay service, wherein the default backoff indicator value in the random access backoff indicator is 0 for a specific user equipment which is a user equipment with a short delay, or a user equipment with a short-delay service; or wherein the processor is further configured to send the random access request over a random access resource corresponding to a category of the user equipment among the different random access resources pre-allocated by the base station for the different categories of user equipments; or wherein the processor is further configured to determine a time value corresponding to a backoff indicator value in the random access backoff indicator according to a category of the user equipment, and to initiate the random access according to the time value, wherein the backoff indicator value in the random access backoff indicator corresponds to different time values for the different categories of user equipments.

18. The user equipment according to claim 16, wherein the processor is further configured to initiate the random access according to a backoff indicator value determined according, to a user demand of the user equipment, or the category of the user equipment among a plurality of backoff indicator values indicated in the backoff indicator carried in the random access response, wherein the plurality of backoff indicator values are indicated in the random access backoff indicator carried in the random access response by carrying indicators of the categories of user equipments, and backoff indicator parameters corresponding to the categories of user equipments in a Media Access Control (MAC) sub-header.

19. The user equipment according to claim 16, wherein the processor is configured to categorize the user equipment according to one or more of a category of user equipment, a Quality of service Class Identifier (QCI) demand of a user equipment user service, a QCI demand of a user equipment service, a network serving the user equipment, a network serving the user equipment service, an RAN-side slice serving the user equipment, and a Radio Access Network (RAN)-side slice serving the user equipment service; or when there are a plurality of services of the user equipment, to determine a service demand for triggering a random access as the current demand of the user equipment, and to categorize the user equipment according to the service demand.

* * * * *